(12) United States Patent
Liu et al.

(10) Patent No.: US 6,615,153 B2
(45) Date of Patent: Sep. 2, 2003

(54) METHOD FOR MANAGING AND USING TEST SYSTEM

(75) Inventors: Yi Bo Liu, Tien Chin (CN); Tong S. Chen, Taipei (TW); Kuang Shin Lin, Taipei (TW)

(73) Assignee: Inventec Corporation, Taipei (TW)

( * ) Notice: Subject to any disclaimer, the term of this patent is extended or adjusted under 35 U.S.C. 154(b) by 23 days.

(21) Appl. No.: 09/881,789

(22) Filed: Jun. 14, 2001

(65) Prior Publication Data

US 2002/0072873 A1 Jun. 13, 2002

(30) Foreign Application Priority Data

Jun. 14, 2000 (TW) ........................................ 89111557 A

(51) Int. Cl.[7] ............................ G01L 15/00; G05B 15/00
(52) U.S. Cl. ........................ 702/121; 702/122; 702/123; 700/83; 700/84; 700/85; 709/217; 709/218; 709/219; 709/223; 709/224; 709/225
(58) Field of Search ................................. 702/121, 122, 702/123; 700/83–85; 709/217, 218, 219, 223, 224, 225

(56) References Cited

U.S. PATENT DOCUMENTS

| | | | | |
|---|---|---|---|---|
| 5,696,898 A | * | 12/1997 | Baker et al. | 707/9 |
| 5,997,476 A | * | 12/1999 | Brown | 702/100 |
| 6,381,604 B1 | * | 4/2002 | Caughran et al. | 707/10 |

* cited by examiner

*Primary Examiner*—John Barlow
*Assistant Examiner*—Meagan S. Walling
(74) *Attorney, Agent, or Firm*—Sawyer Law Group LLP

(57) ABSTRACT

A method for managing and using a test system is proposed, which is applied to the test system comprising a test server and a test workstation, and allows a user to perform a test and obtain a test report according to the user's right for accessing the test server and an actual operating state of the test workstation. The users are assigned to different test groups set up in the test server. The test workstation activates a start-up window for the user to input data thereto and transmits the data to the test server. The test server then processes the transmitted data and produces the corresponding test report according to the right of the user and the right of the test group which the user belongs to for accessing the test server.

4 Claims, 3 Drawing Sheets

METHOD FOR MANAGING AND USING TEST SYSTEM

FIELD OF THE INVENTION

The present invention relates to methods for managing and using test systems, and more particularly, to a method for managing and using a test system having a test server and a test workstation.

BACKGROUND OF THE INVENTION

Conventionally, when performing a test on a production line, several automatic test tools are used to quickly complete the test. During the test, a start-up window of a test tool server needs to be initiated, allowing a tested machine to be activated and connected with a test server through a network. Accordingly, test results can be uploaded to the test server from the test tool server. Moreover, a user needs to have an account for logging in the test server for uploading and downloading, and another account for a database of the test server for uploading the test results thereto. In order to solve the requirement of multiple accounts, the present solutions are:

1. a common account for the test server and another common account for the database are available for all testers; and
2. each tester is assigned a unique account for the test server and another unique account for the database.

In the conventional method for managing and using a test system as described above, the first solution is relatively easier to manage but generates security problems due to inability to set up the access right, range and deadline for different users, whereas the second solution, assigning different accounts for different users, results in difficulties in managing the test system.

In order to solve the above-mentioned problems, a novel method for managing and using a test system is proposed, which is applied to the test system comprising a test server and a test workstation. The method allows a user to perform a test and obtain a corresponding test report according to the user's right for accessing the test server and the actual operating state of the test workstation. This not only facilitates the management for the test server but also assures the security of the test system.

SUMMARY OF THE INVENTION

The primary objective of the present invention is to provide a method for managing and using a test system having a test server and a test workstation. The method allows a user to perform a test and obtain a corresponding test report according to the user's right for accessing the test server and the actual operating state of the test workstation. Moreover, the test server and a database of the test server can be assured in security during the performance of the test. In addition, the management for the test server of the test system can be facilitated in the condition of the security of the test system being assured.

In accordance with the above objectives of the present invention, a method for managing and using a test system is proposed, which is applied to the test system having a test server and a test workstation. The method allows a user to perform a test and obtain a corresponding test report according to the user's right for accessing the test server and the actual operating state of the test workstation. This not only facilitates the management for the test server but also assures the security of the test system.

The test server comprises a message input level, an account management level, a server investigation level, a database investigation level and a database. In managing the test system, the test server is set up with test groups according to actual requirements of the test system, wherein each test group deserves individual access right, range and deadline for the database, and the users are assigned to different test groups according to their positions and working requirements. The message input level allows the user to input a user's message for creating or deleting an account. The account management level is used to authenticate the user's message for properly performing the account creation or deletion. The server investigation level is used to manage the accounts and the various test groups in the test server, so as to assign certain access rights via adding, modifying and deleting the rights for the users and for the test groups. The database investigation level is used to manage the accounts in the database, so as to assign certain rights for accessing the database via adding, modifying and deleting the rights for the users and for the test groups. The test workstation allows the user to input data thereto for initiating the test to be performed, and then transmits the inputted data to the test server. The test server processes the inputted data and produces a corresponding test report according to the right of the user and the right of the test group which the user belongs to for accessing the test server. In conclusion, for managing and using the test system, there are set up for a user an account, a identification number, a password, a test group, the right for accessing the database, and the right for uploading or downloading data in the database, allowing a test to be performed and a corresponding test report to be generated according to data inputted by the user.

BRIEF DESCRIPTION OF DRAWINGS

The above and other objectives, features, and advantages of the present invention will become apparent from the following description when taken in conjunction with accompanying drawings which illustrate preferred embodiments of the present invention by means of examples. The contents of the accompanying drawings are described as follows.

DETAILED DESCRIPTION OF PREFERRED EMBODIMENTS

Figure 1:
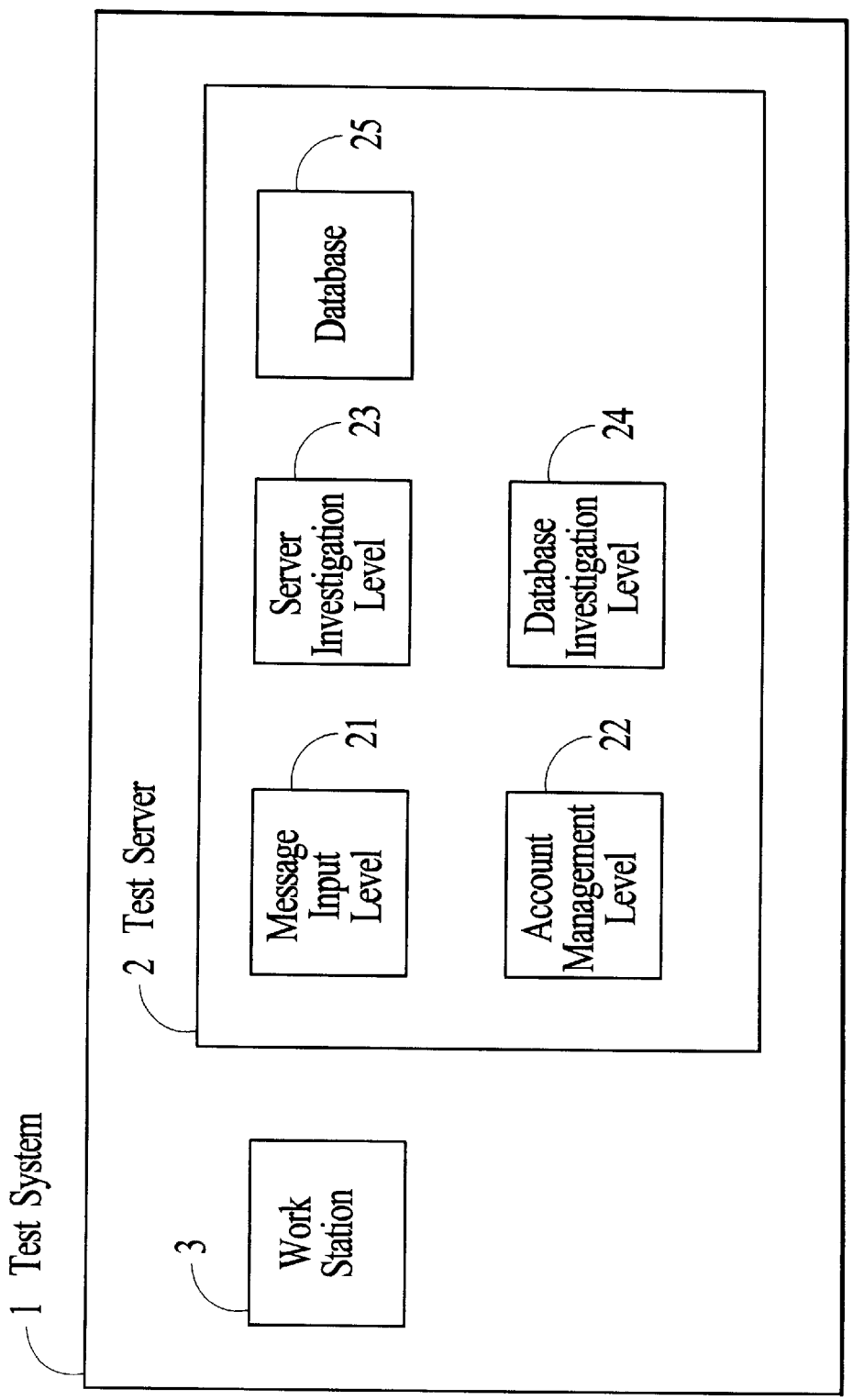
FIG. 1 is a block diagram illustrating the basic architecture of the test system used in the method for managing and using a test system according the present invention.

FIG. 1 is a block diagram illustrating the basic architecture of the test system used in the method for managing and using a test system according to the present invention. As shown in the drawing, the test system 1 comprises a test server 2 and a test workstation 3. The test workstation 3 allows a user to input data thereto and transmits the data to the test server 2 for producing a test report. The test server 2 processes the data transmitted from the test workstation 3 and accordingly generates the test report, which is then transmitted to the test workstation 3 and displayed therein for the user.

The test server 2 comprises a message input level 21, an account management level 22, a server investigation level 23, a database investigation level 24 and a database 25. The test server 2 is set up with test groups according to actual requirements of the test system 1, wherein each test group deserves individual access right, range and deadline for the database 25, and the users are assigned to different test groups according to their positions and working requirements. The message input level 21 allows the user to input a user's message for creating or deleting an account. The account management level 22 is used to authenticate the user's message for properly performing the account creation or deletion. The server investigation level 23 is used to manage the accounts and the various test groups in the test server, so as to assign certain access rights via adding, modifying and deleting the rights for the users and for the test groups which the users are assigned to. For example, if the test group is assigned the right for browsing, the users thereof are only allowed for browsing; if the test group is assigned the right for browsing and modifying, the users thereof are allowed for browsing and modifying; if the test group is a system administrator, the users thereof are assigned the right for completely controlling the system. Upon creating a new account, a new user is assigned to the test group according to type of the user with the certain right being accordingly provided therefor. The database investigation level 24 is used to manage the accounts in the database 25, so as to assign certain rights for accessing the database 25 via adding, modifying and deleting the rights for the users and for the test groups which the users are assigned to. For example, if the test group is assigned the right for browsing through the database 25, the users thereof are only allowed for browsing through the database 25; if the test group is assigned the right for browsing and modifying the database 25, the users thereof are allowed for browsing and modifying the database 25; if the test group is a system administrator, the users thereof are assigned the right for completely controlling the database 25. Upon creating a new account, a new user is assigned to the test group according to type of the user with the certain right for accessing the database 25 being accordingly provided therefor.

The test workstation 3 activates a start-up window, allowing the user to input data thereto for initiating the test to be performed, and then transmits the inputted data to the test server 2. The test server 2 processes the inputted data and produces the corresponding test report according to the right of the user and the right of the test group which the user belongs to for accessing the test server 2. As a result, for managing the test system 1, there are set up for the user an account, a identification number, a password, the test group which the user is assigned to, the right for accessing the database 25, and the right for uploading or downloading data in the database 25, allowing the test to be performed for the test system 1 and the corresponding test report to be generated according to the data inputted by the user.

Figure 2:
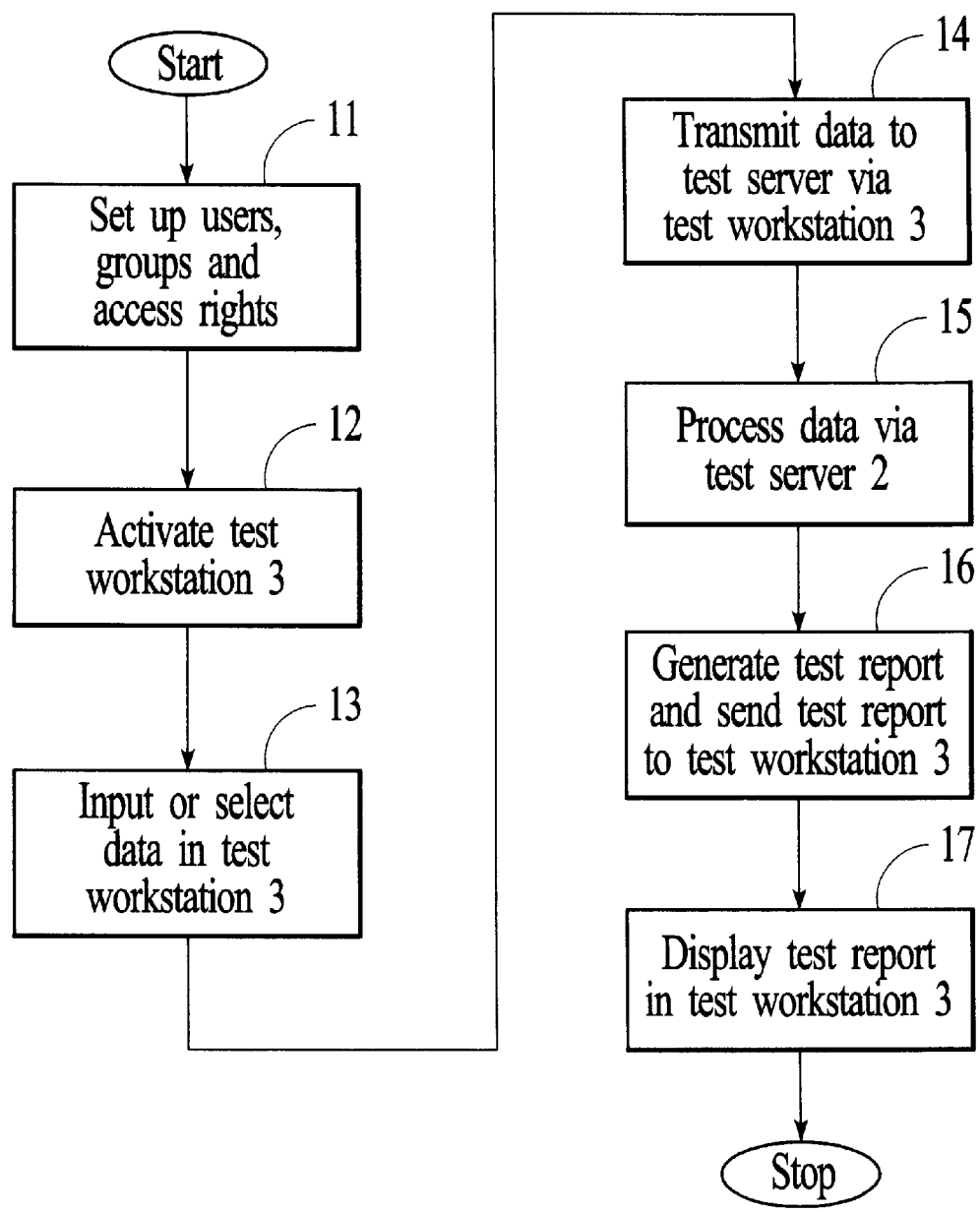
FIG. 2 is a flow chart illustrating the steps involved in managing the test system by using the method for managing and using a test system according to the present invention.

FIG. 2 is a flow chart illustrating the steps involved in managing the test system by using the method for managing and using a test system according to the present invention.

First, in step 11, in the test server 2 there are set up a message input level 21, an account management level 22, a server investigation level 23, a database investigation level 24 and a database 25. In addition, in the test server 2 there are further set up users, test groups for the users and rights for accessing the test server 2 and the database 25 of the test server 2 for the users and the test groups. Then, it moves on to step 12.

In step 12, the test workstation 3 is activated with a start-up window being displayed, allowing the user to input data thereto for performing a test. It then moves on to step 13.

In step 13, in the start-up window of the test workstation 3, the user inputs or selects the test group, and inputs an account, a password or other information of the user required for performing the test. Then it moves on to step 14.

In step 14, the test workstation 3 transmits the information inputted by the user to the test server 2. It then moves on to step 15.

In step 15, the test server 2 processes the transmitted information according to the right of the user and the right of the test group for the user for accessing the test server 2. It then moves on to step 16.

In step 16, the test server 2 generates a test report corresponding to the processed information and transmits the test report to the test workstation 3. Then it moves on to step 17.

In step 17, the test workstation 3 displays the test report for the user.

Figure 3:
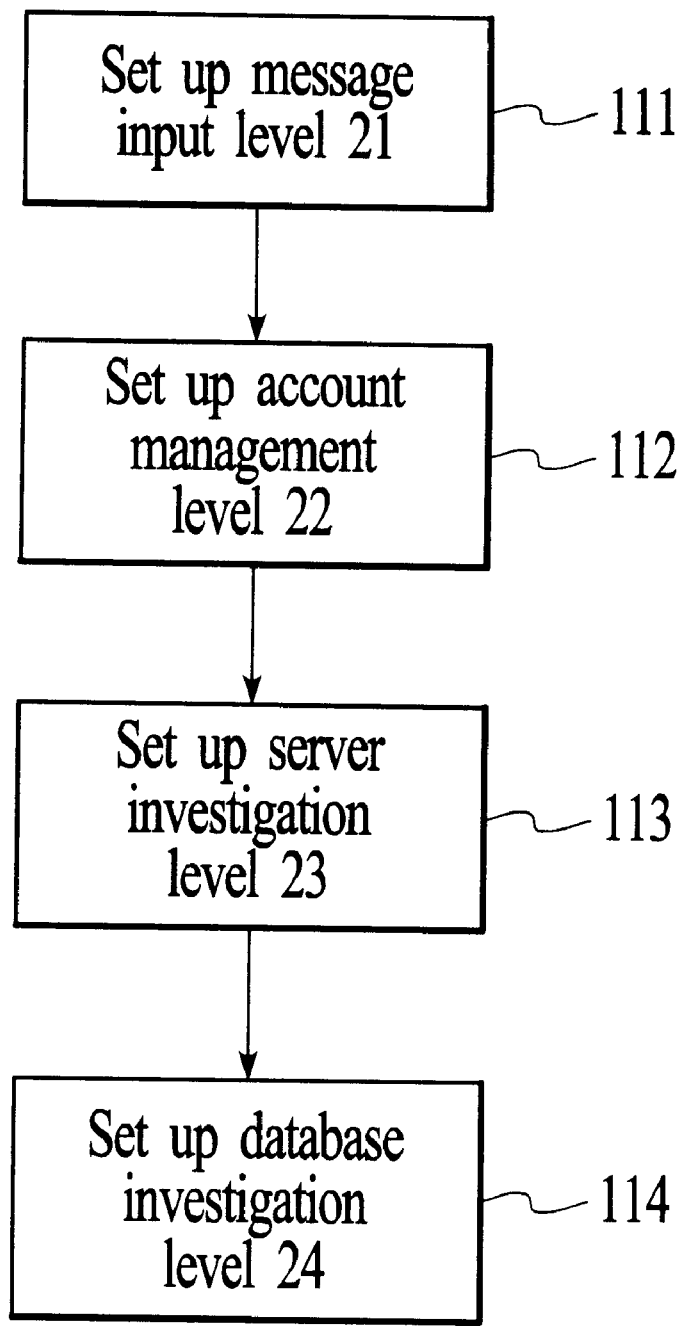
FIG. 3 is a flow diagram illustrating in detail the steps involved in setting up the message input level, account management level, server investigation level, database investigation level and database for the test server in FIG. 2.

FIG. 3 is a flow diagram illustrating in detail the steps involved in setting up the message input level, account management level, server investigation level, database investigation level and database for the test server in FIG. 2.

First, in step 111, there is set up the message input level 21 for the user to input a user message thereto for creating or deleting an account. Then it moves on to step 112.

In step 112, the account management level 22 is set up for authenticating the user's message and for properly creating or deleting the account accordingly. It then moves on to step 113.

In step 113, the server investigation level 23 is used to manage the accounts and the test groups in the test server 2, so as to assign certain access rights via adding, modifying and deleting the rights for the users and for the test groups which the users are assigned to. For example, if the test group is assigned the right for browsing, the users thereof are only allowed for browsing; if the test group is assigned the right for browsing and modifying, the users thereof are allowed for browsing and modifying; if the test group is the system administrator, the users thereof are assigned the right for completely controlling the system. Upon creating a new account, a new user is assigned to the test group according to type of the user with the certain right being accordingly provided therefor. Then it moves on to step 114.

In step 114, the server investigation level 24 is created and used to manage the accounts of the database 25. The database investigation level 24 is used to manage the accounts in the database 25, so as to assign certain rights for accessing the database 25 via adding, modifying and deleting the rights for the users and for the test groups which the users are assigned to. For example, if the test group is assigned the right for browsing through the database 25, the users thereof are only allowed for browsing through the database 25; if the test group is assigned the right for browsing and modifying the database 25, the users thereof are allowed for browsing and modifying the database 25; if the test group is the system administrator, the users thereof are assigned the right for completely controlling the database 25. Upon creating a new account, a new user is assigned to the test group according to type of the user with the certain right for accessing the database 25 being accordingly provided therefor.

As concluded from the above-mentioned, the method for managing and using a test system of the invention, which is applied to the test system having a test server and a test workstation, allows a user to perform a test and obtain a test report according to the user's right for accessing the test server and an actual operating state of the test workstation. As a result, the method for managing and using a test system of the invention helps assure the security of the test server during the performance of the test due to the user being assigned the certain right for accessing the test system. Accordingly, the management for the test server of the test system can be facilitated in such a condition that the security of the test system is assured.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for managing and using a test system having a test server and a test workstation, for allowing a user to perform a test and obtain a test report according to the user's right for accessing the test server and an actual operating state of the test workstation, the method comprising the steps of:

(a) setting up users, test groups for the users and rights for accessing the test server for the users and the test groups for the users in the test server;

(b) activating the test workstation for displaying a start-up window thereof, which allows the user to input data thereto for performing the test;

(c) inputting or selecting the test group, and inputting an account, a password or other information by the user in the start-up window;

(d) transmitting the information inputted by the user to the test server via the test workstation;

(e) processing the transmitted information via the test server according to the right of the user and the right of the test group for the user for accessing the test server;

(f) generating the test report corresponding to the processed information and transmitting the test report to the test workstation via the test server;

(g) displaying the test report via the test workstation for the user; and the setting up rights step (h) comprises the steps of:

(h1) inputting a user's message by the user for creating or deleting an account;

(h2) authenticating the user's message for properly creating or deleting the account;

(h3) managing the accounts and the test groups in the test server for assigning certain rights via adding, modifying, deleting the rights for the users and for the test groups for the users in the test server, so as to assign a new user to the test group according to type of the user and to accordingly assign the user with the certain right upon creating a new account; and (h4) managing the accounts of the database for properly creating or deleting the account for assigning certain rights via adding, modifying, deleting the rights for the users and for the test groups in the test server, so as to assign a new user to the test group according to type of the user and to accordingly assign the user with the certain right upon creating a new account.

2. A method for managing and using a test system having a test server and a test workstation, wherein the test server is built with a message input level, an account management level, a server investigation level, a database investigation level and a database, for allowing a user to perform a test and obtain a test report according to the user's right for accessing the test server and an actual operating state of the test workstation, the method comprising the steps of:

(a) setting up the message input level, the account management level, the server investigation level, the database investigation level and the database in the test server, and setting up users, test groups for the users and rights for accessing the test server for the users and the test groups in the test server;

(b) activating the test workstation for displaying a start-up window thereof, which allows the user to input data thereto for performing the test;

(c) inputting or selecting the test group, and inputting an account, a password or other information by the user in the start-up window;

(d) transmitting the information inputted by the user to the test server via the test workstation;

(e) processing the transmitted information via the test server according to the right of the user and the right of the test group for the user for accessing the test server;

(f) generating the test report corresponding to the processed information and transmitting the test report to the test workstation via the test server; and (g) displaying the test report via the test workstation for the user.

3. The method for managing and using a test system of claim 2, further comprising a step (h) of setting up rights for accessing the database of the test server for the users and the test groups for the users in the test server.

4. The method for managing and using a test system of claim 3, wherein the setting up rights step (h) comprises the steps of:

(h1) setting up the message input level for inputting a user's message via the user and for creating or deleting an account accordingly;

(h2) setting up the account management level for authenticating the user's message and for properly creating or deleting the account accordingly;

(h3) setting up the server investigation level for managing the accounts and the test groups in the test server for assigning certain rights via adding, modifying, deleting the rights for the users and for the test groups for the users in the test server, so as to assign a new user to the test group according to type of the user and to accordingly assign the user with the certain right upon creating a new account; and (h4) setting up the database investigation level for managing the accounts of the database for properly creating or deleting the account for assigning certain rights via adding, modifying, deleting the rights for the users and for the test groups in the test server, so as to assign a new user to the test group according to type of the user and to accordingly assign the user with the certain right upon creating a new account.

* * * * *